United States Patent [19]
de Vos

[11] 3,953,010
[45] Apr. 27, 1976

[54] RESILIENT MOUNTING FOR A SHOCK ABSORBER

[75] Inventor: Jacob de Vos, Oud-Beijerland, Netherlands

[73] Assignee: ITT Industries, Inc., New York, N.Y.

[22] Filed: Feb. 3, 1975

[21] Appl. No.: 546,455

[30] Foreign Application Priority Data
Feb. 5, 1974 Netherlands.......................... 7401538

[52] U.S. Cl................................... 267/34; 267/8 R
[51] Int. Cl.²........................................ B60G 11/56
[58] Field of Search.................. 267/34, 8, 60, 63 R

[56] References Cited
UNITED STATES PATENTS

| | | |
|---|---|---|
| 3,145,985 | 8/1964 | BourcierDe Carbon............... 267/34 |
| 3,251,591 | 5/1966 | McNally ................................ 267/34 |
| 3,263,983 | 8/1966 | Bliven................................... 267/34 |
| 3,482,829 | 12/1969 | Kidby.................................... 267/34 |

*Primary Examiner*—James B. Marbert
*Attorney, Agent, or Firm*—J. B. Raden; D. P. Warner

[57] ABSTRACT

A resilient mounting is disclosed for an automotive wheel suspension system. It includes a telescopic shock absorber and a coaxially arranged helical spring. Means are provided through which forces from the shock absorber and from the spring are separately transferred to the body and therefore bending forces to the shock absorber are prevented and wear of the shock absorber is diminished.

6 Claims, 4 Drawing Figures

RESILIENT MOUNTING FOR A SHOCK ABSORBER

BACKGROUND OF THE INVENTION

1. Field of the Invention

The invention relates to a resilient mounting for a supporting system. More particularly, it relates to a wheel suspension system for a vehicle, and includes a shock absorber having two telescoping parts, each of which is provided with a cup so as to support a helically wound spring coaxially arranged around the shock absorber and in which the one part can be connected to the supporting construction and the other part to the member to be supported, in which one of said mountings is provided with a resilient member on which the cup rests and through which both the bearing force of the spring and the damping forces occurring during the ingoing motions of the shock absorber are transferred to the supporting construction or the member to be supported.

2. Description of the Prior Art

A mounting, of the kind described above, for a supporting system is known from U.S. Pat. No. 2,999,678.

In this known mounting, the damping force is transferred to the resilient member through a cup member, against which also rests the supporting spring. The resilient member is loaded by the supporting force increased by the damping force during ingoing motion and decreased by the damping force during outgoing motion of the piston.

When an angular rotation is forced upon the supporting system consisting of the spring and the shock absorber round an axis normal to its own axis relative to the supported or the supporting system, the cup member will follow this angular rotation only partly because the required tilting is opposed by the resilient member which is clamped by the relatively heavy pressure of the spring. Consequently the cup members at each end of the shock absorber will no longer be parallel to each other, the spring will be forced into a bent position and a bending force will be impressed upon the shock absorber. This bending force will affect proper operation of the shock absorber and also cause excessive wear of the guiding parts of the shock absorber.

SUMMARY OF THE INVENTION

It is an object of the present invention to avoid the disadvantages referred to above.

To attain this object and related objects, the resilient mounting is characterized in that the cup resting against the resilient member consists of two separate portions, the first portion of which transfers the damping force occurring during the ingoing stroke of the shock absorber and the second part of which transfers the carrying force of the helical spring onto the resilient member.

In this manner it is made possible for the angular rotation of the portion of the cup loaded by the shock absorber to differ from the angular rotation of the portion of the cup loaded by the helical spring. The favorable result is that the first portion of the cup which is secured to the shock absorber always can remain parallel to the cup at the other end of the shock absorber so that no appreciable bending force is exerted upon the shock absorber.

In order to prevent the two parts of the cup from touching each other, the resilient mounting can be arranged so that the portion of the resilient member absorbing the damping forces of the shock absorber has a smaller thickness than the portion which absorbs the supporting force of the helical spring.

In order to be able to handle the shock absorber with the supporting spring in the non-mounted state of the carrying system as a unit, the mounting of the present invention can be arranged so that the first portion of the cup is secured immovably in the axial direction to the shock absorber and that the second portion of the cup is coaxially arranged around the first portion and rests against it in the pre-mounted state of the carrying system. Any bias of the spring, already present in the pre-mounted state, is thus absorbed by the second portion of the cup and is transferred through the first portion of the cup of the spring onto the end of the shock absorber, which simplifies mounting the system in a vehicle.

BRIEF DESCRIPTION OF THE DRAWINGS

The advantages of the construction according to the invention will be explained further with reference to embodiments shown in the related drawings in which.

DESCRIPTION OF PREFERRED EMBODIMENTS

Figure 1:
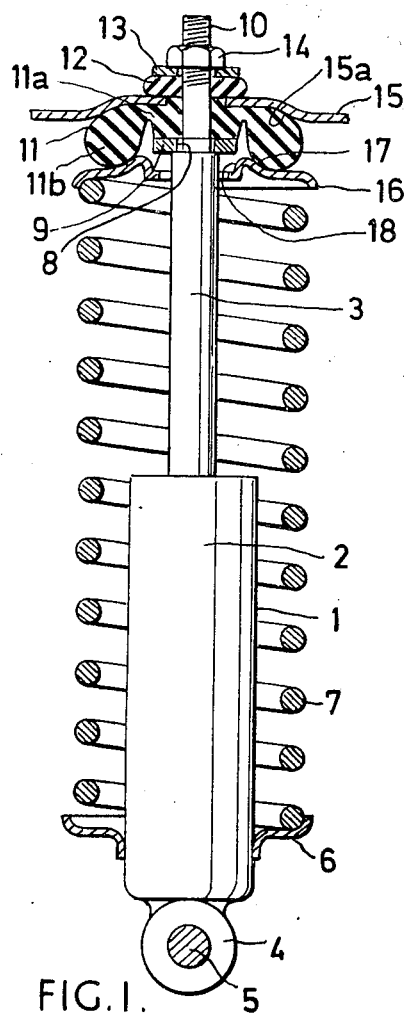
FIG. 1 represents a partial longitudinal section of an installed wheel suspension system for a vehicle which is provided with a resilient mounting according to the present invention.

Referring to FIG. 1, the telescopic shock absorber 1 consists of a housing 2 and a piston rod 3 movable therein. The housing 2 is equipped with a connection eye 4 through which the shock absorber is secured to a wheel support 5 and with a spring cup 6, onto which a helical spring 7 rests in a coaxial arrangement around the shock absorber.

The piston rod 3 has screwthread 8 onto which a first cup portion 9 is secured and an end portion 10 of smaller diameter over which two members 11 and 12 of resilient material and a washer 13 are placed and secured by a nut 14.

The resilient members 11 and 12 are arranged on either side of a part 15 of the vehicle to be supported and are clamped to it with properly dimensioned pressure by the nut 14.

The contiguous surface of vehicle part 15 against resilient member 11 is shaped to prevent any displacement of said member relative to the vehicle part.

Portion 11a of resilient member 11 makes contact with the first cup portion 9, which is firmly secured to the piston rod 3. Thus the damping force during the ingoing motion of the shock absorber is transferred by portion 11a of the resilient member 11 onto vehicle part 15.

Portion 11b of resilient member 11 contacts a second portion 16 of the cup, against which helical spring 7 rests. Thus, the supporting force of the helical spring 7 is transferred via portion 11b of the resilient member 11 to vehicle part 15.

Cup portion 16 has a concentric elevation 17 so as to have a centering action in cooperation with portion 11b enabling transverse forces to be transferred onto said portion when the supporting system is subjected to an angular rotation.

Figure 2:
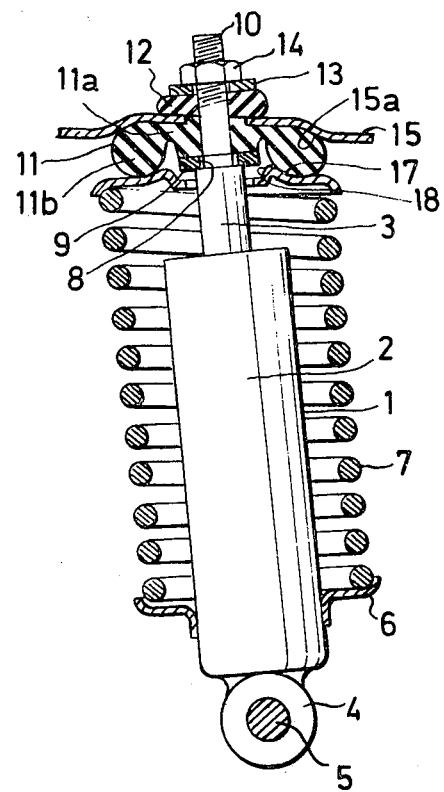
FIG. 2 represents the wheel suspension system of FIG. 1 after an angular rotation.

Owing to the bias caused by the springing force together with the resistance against continued compression, resilient portion 11b will endure a smaller angular rotation after an angular rotation of the system as shown in FIG. 2 than resilient portion 11a, which is mounted nearly without any bias and therefore will follow the entire angular rotation of the supporting system. Consequently, even after an angular rotation of the system, cup portion 9 and cup 6 remain in parallel to each other, causing the bending forces exerted upon the shock absorber parts to be negligibly small. This provides the desired effect, whereby the operation of the shock absorber is not adversely affected and wear is reduced.

For proper operation it is essential that, during rotation, portions 9 and 16 are not enabled to touch each other. This can be achieved by choosing the outer diameter of cup portion 9 to be sufficiently small relative to the diameter of the aperture of cup portion 16.

Figure 3:
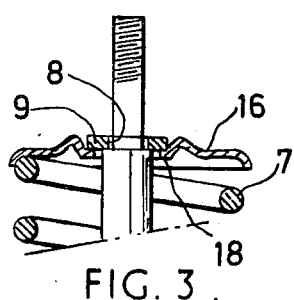
FIG. 3 represents the resilient mounting of FIG. 1 in the pre-installed state of the supporting system.

A favorable solution to meet the above requirements is shown in FIGS. 1 and 2 which illustrate additional features. Portion 11a is designed to have a smaller thickness than portion 11b. Consequently, cup portions 9 and 16 are axially shifted, making it possible to choose the outer diameter of cup portion 9 larger than the aperture in cup portion 16 without impairing proper operation of the supporting system. As shown in FIG. 3 cup portion 16, centered by rim 18, can rest upon portion 9. This arrangement provides a favorable solution in that the supporting system in its pre-mounted state can have a previously biased spring, which considerably simplifies the mounting of the system to the vehicle.

Figure 4:
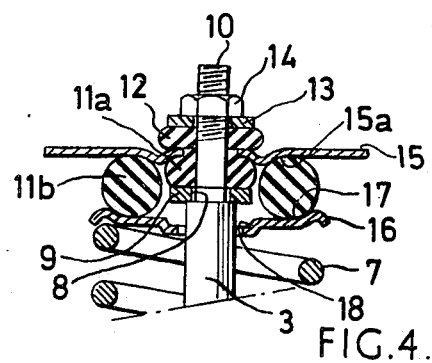
FIG. 4 represents a second embodiment of the resilient mounting of FIGS. 1 and 2.

FIG. 4 shows another embodiment in which portions 11a and 11b are separate resilient members providing a possibility of differentiating their mutual properties, especially their elasticity.

While the principles of the invention have been described above in connection with specific apparatus and applications, it is to be understood that this description is made only by way of example and not as a limitation on the scope of the invention.

I claim:

1. A resilient mounting for a supporting system including a shock absorber having two telescoping parts, each part including a cup to support one end of a helically wound spring coaxially arranged around the shock absorber between the cups, a first mounting for connecting one part to a supporting member, and a second mounting for connecting the other part to the member to be supported, one of said mountings including a resilient member against which the respective cup rests and through which both the bearing force of the spring and the damping forces occurring during the ingoing motions of the shock absorber are transferred to the supporting construction or the member to be supported, wherein the improvement comprises a cup having first and second portions resting against the resilient member which includes two portions, the first cup portion serving to transfer the damping force occurring during the ingoing stroke of the shock absorber and the second cup portion serving to transfer the carrying force of the helical spring onto the resilient member.

2. A resilient mounting according to claim 1, in which the second cup portion has a rim, and the rim is positioned to center said second cup portion in cooperation with said resilient member relative to the axis of symmetry of the system.

3. A resilient mounting according to claim 1, in which the portion of the resilient member, by which the shock absorber force is transferred, has a smaller thickness than the portion of the member by which the carrying force of the helical spring is transferred.

4. A resilient mounting according to claim 1, in which the first cup portion is firmly secured to the piston rod of the shock absorber and the outer diameter of said first cup portion is larger than the diameter of an aperture in said second cup portion.

5. A resilient mounting according to claim 4, in which the second cup portion has a centering rim, enabling it to cooperatively interact with the first cup portion.

6. A resilient mounting according to claim 1, in which the resilient member consists of two separate portions, means positioning the first portion to cooperate with said first cup portion and means positioning the second portion to cooperate with said second cup portion.

* * * * *